United States Patent
Sakamoto (10) Patent No.: US 8,346,786 B2
(45) Date of Patent: Jan. 1, 2013

(54) INFORMATION PROCESSING SYSTEM, INFORMATION PROCESSING APPARATUS, INFORMATION PROCESSING METHOD AND COMPUTER READABLE MEDIUM

(75) Inventor: Shoji Sakamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 264 days.

(21) Appl. No.: 12/548,394

(22) Filed: Aug. 26, 2009

(65) Prior Publication Data

US 2010/0191751 A1 Jul. 29, 2010

(30) Foreign Application Priority Data

Jan. 27, 2009 (JP) ................................. 2009-015441

(51) Int. Cl.
*G06F 17/30* (2006.01)
(52) U.S. Cl. ........ 707/756; 707/620; 707/633; 707/634; 707/655
(58) Field of Classification Search .................. 707/610, 707/611, 617, 619, 620, 633, 655, 656, 657, 707/659, 660, 756
See application file for complete search history.

(56) References Cited

U.S. PATENT DOCUMENTS

| | | | |
|---|---|---|---|
| 6,671,701 B1 * | 12/2003 | Chouinard | 1/1 |
| 7,200,668 B2 * | 4/2007 | Mak et al. | 709/230 |
| 7,257,649 B2 * | 8/2007 | Rabbers et al. | 709/248 |
| 7,478,170 B2 * | 1/2009 | Ong et al. | 709/246 |
| 7,685,185 B2 * | 3/2010 | Ramasubramanian et al. | 707/638 |
| 7,761,535 B2 * | 7/2010 | Huang et al. | 709/219 |
| 7,836,158 B2 * | 11/2010 | Kasatani | 709/220 |
| 7,865,462 B2 * | 1/2011 | Hara | 707/610 |
| 7,870,315 B2 * | 1/2011 | Moon | 710/62 |
| 2003/0172113 A1 * | 9/2003 | Cameron et al. | 709/204 |
| 2009/0019223 A1 * | 1/2009 | Lection et al. | 711/115 |
| 2009/0265562 A1 * | 10/2009 | Oe et al. | 713/190 |

FOREIGN PATENT DOCUMENTS

| | | | |
|---|---|---|---|
| JP | 2002-140277 A | | 5/2002 |
| JP | 2010176187 A | * | 8/2010 |

* cited by examiner

*Primary Examiner* — Shahid Alam
*Assistant Examiner* — Evan Aspinwall
(74) *Attorney, Agent, or Firm* — Sughrue Mion, PLLC (57) ABSTRACT

An information processing system includes an acceptance section, a first processing section, a conversion section and a second processing section. The acceptance section accepts first storage location information that is indicative of where a first electronic file in a first storage unit is stored. The first processing section processes the first electronic file in accordance with a first processing content. The conversion section converts the first storage location information to second storage location information that is indicative of where a second electronic file in a second storage unit is stored. The second electronic file has an identical content as that of the first electronic file. The second processing section processes the second electronic file in accordance with a second processing content.

10 Claims, 5 Drawing Sheets

30 SYNCHRONIZATION SETTING INFORMATION

| | | |
|---|---|---|
| 300A | FIRST SYNCHRONIZATION TARGET FOLDER | hostA://FolderA |
| 300B | SECOND SYNCHRONIZATION TARGET FOLDER | hostB://FolderB |
| 301 | SYNCHRONIZATION TIME | AM2:00 |
| 302 | SYNCHRONIZATION PERIOD | EVERY DAY |

INFORMATION PROCESSING SYSTEM, INFORMATION PROCESSING APPARATUS, INFORMATION PROCESSING METHOD AND COMPUTER READABLE MEDIUM

CROSS-REFERENCE TO RELATED APPLICATIONS

This application is based on and claims priority under 35 U.S.C. 119 from Japanese Patent Application No. 2009-15441, filed on Jan. 27, 2009.

BACKGROUND

1. Technical Field

The present disclosure relates to an information processing system, an information processing apparatus, an information processing method and a computer readable medium.

2. Related Art

In an integrated communication system in the related-art, business-use file data (electronic file) is simultaneously provided to two terminals on the Web.

SUMMARY

According to an aspect of the present invention, an information processing system includes an acceptance section, a first processing section, a conversion section and a second processing section. The acceptance section accepts first storage location information that is indicative of where a first electronic file in a first storage unit is stored. The first processing section processes the first electronic file in accordance with a first processing content. The conversion section converts the first storage location information to second storage location information that is indicative of where a second electronic file in a second storage unit is stored. The second electronic file has an identical content as that of the first electronic file. The second processing section processes the second electronic file in accordance with a second processing content.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described with the drawings hereinafter.

First Exemplary Embodiment

Figure 1:
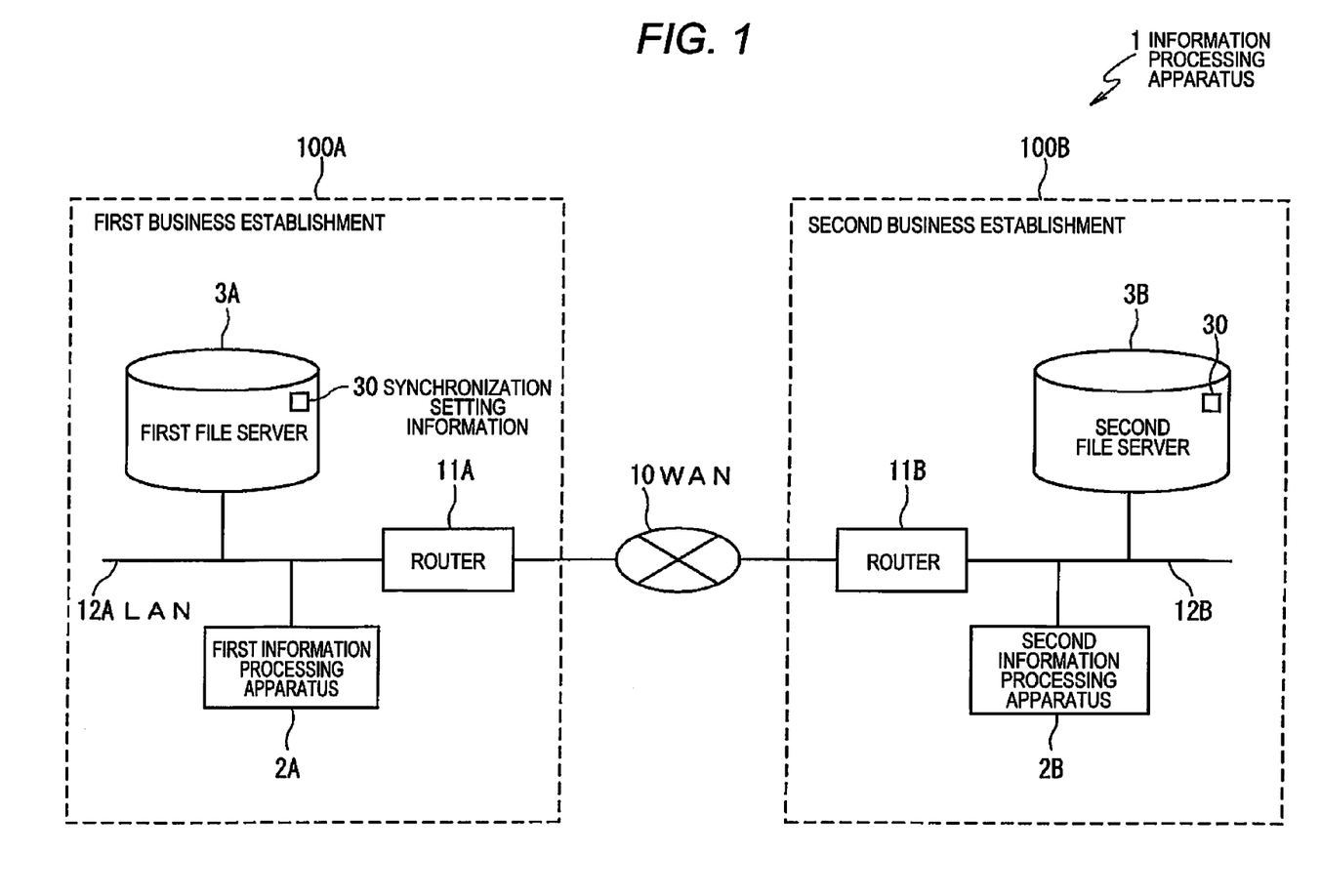
FIG. 1 is an overall schematic view showing an example of an information processing system according to a first exemplary embodiment of the present invention.

FIG. 1 is an overall schematic view showing an example of an information processing system according to a first exemplary embodiment of the present invention. In an information processing system 1, a router 11A provided in a first business establishment 100A and a router 11B provided in a second business establishment 100B are connected to each other via a WAN (Wide Area Network) 10. The first and second business establishments 100A and 100B may be located in different countries and may belong to different companies.

In the first business establishment 100A, in addition to the router 11A described above, a first information processing apparatus 2A and a first file server 3A as a first storage section are provided. The router 11A, the first information processing apparatus 2A, and the first file server 3A are mutually connected to each other via a LAN (Local Area Network) 12A.

In the second business establishment 100B, similarly to the first business establishment 100A, a second information processing apparatus 2B and a second file server 3B as a second storage section are provided in addition to the router 11B described above. The router 11B, the second information processing apparatus 2B, and the second file server 3B are mutually connected to each other via a LAN 12B.

The WAN 10 is a communication network for connecting the first and second business establishments 100A and 100B to each other by using, e.g., a telephone line, a dedicated line, or the like. The LANs 12A and 12B are communication networks for connecting the routers, the information processing apparatus, and the file severs provided in the respective business establishments to each other.

(File Server)

In the first and second file servers 3A and 3B, plural files as electronic documents are hierarchically stored using a folder or the like.

In addition, each of the first and second file servers 3A and 3B has a function of performing synchronization processing of the file in accordance with synchronization setting information 30 to be described later. Specifically, the first synchronization target folder in the first file server 3A specified by the synchronization setting information 30 is compared with the second synchronization target folder in the second file server 3B specified by the synchronization setting information 30. Then, a new file existing only in one of the synchronization target folders and an updated file updated in one of the synchronization target folders are transmitted to the file server having the other synchronization target folder. Thus, the first and second file servers 3A and 3B synchronize files stored in first and second synchronization target folders.

Figure 2A:
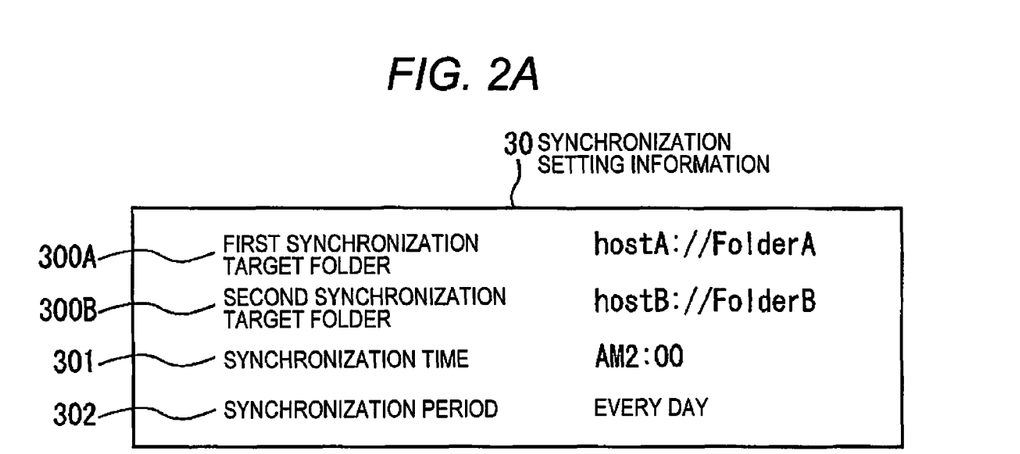
FIG. 2A is a view showing an example of synchronization setting information.

FIG. 2A is a view showing an example of the synchronization setting information. The synchronization setting information 30 includes a first synchronization target folder 300A which is a folder specified in the first file server 3A, a second synchronization target folder 300B which is a folder specified in the second file server 3B, synchronization time 301 which specifies time for performing the synchronization processing, and a synchronization period 302 which specifies a period for performing the synchronization processing. The synchronization period 302 may be specified by the hour or the month in addition to the case where the synchronization period is specified by the day as shown in FIG. 2.

In the synchronization processing according to the exemplary embodiment, the first and second file servers 3A and 3B transmit the new file and the updated file to each other. However, they may be transmitted only from the first file server 3A to the second file server 3B. In addition, the synchronization processing may be performed when an instruction for the synchronization processing is given by a user in addition to the synchronization time 301 and the synchronization period 302. Furthermore, the synchronization target file may be filtered using file attributes such as a file extension, update date and time, a creator, an access right, and the like.

Figure 2B:
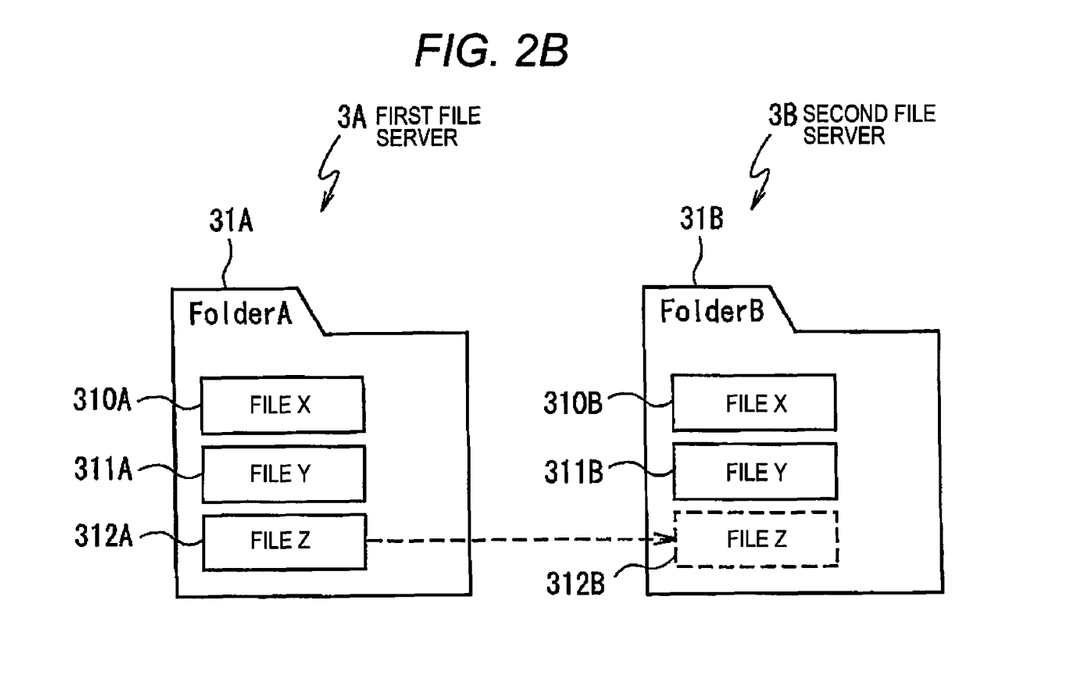
FIG. 2B is a view showing an example of a state where files are stored in each of first and second file servers.

FIG. 2B is a view showing an example of a state where the files are stored in each of the first and second file severs 3A and 3B. In a folder 31A of the first file server 3A, three files 310A to 312A are stored. Also, in a folder 31B of the second file server 3B, two files 310B and 311B are stored. The folders 31A and 31B are specified as the first and second synchronization target folders 300A and 300B in the synchronization setting information 30 shown in FIG. 2A.

In the state of storage described above, when the synchronization processing is performed in accordance with the synchronization setting information 30 shown in FIG. 2A, at a time of "AM 2:00" specified by the synchronization time 301, the state of storage of the files in the synchronization target folder 300A is compared with the state of storage of the files in the second synchronization target folder 300B. As a result, the file 312A is extracted as the new file. Then, the file 312A is transmitted from the first file server 3A to the second file server 3B and is stored as the file 312B in the folder 31B.

(Information Processing Apparatus)

Figure 3:
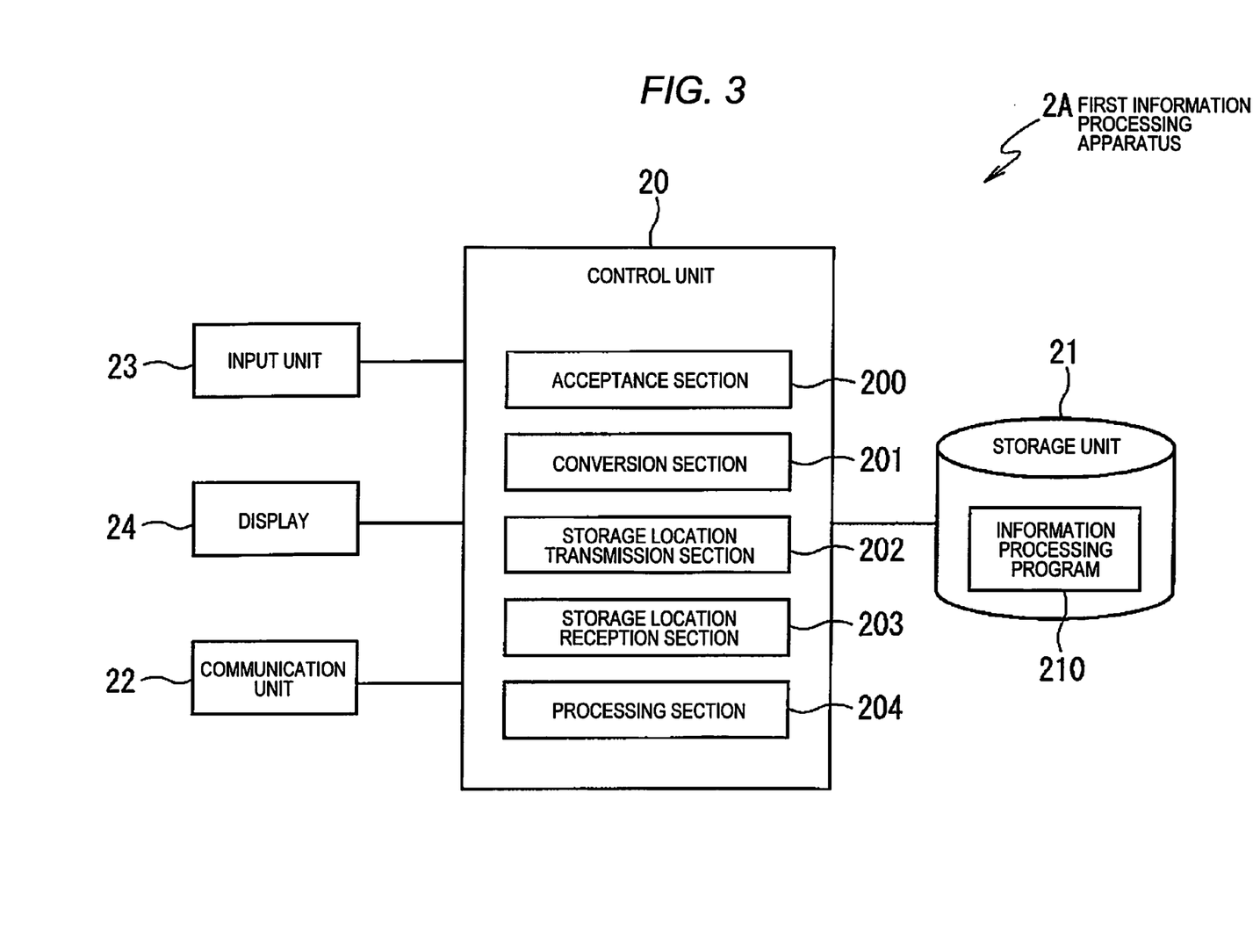
FIG. 3 is a schematic block diagram showing an example of an information processing apparatus according to the first exemplary embodiment of the present invention.

FIG. 3 is a schematic block diagram showing an example of an information processing apparatus according to the first exemplary embodiment of the present invention. Additionally, the first and second information processing apparatus 2A and 2B have the same structure, and thus the description will be now given to the first information processing apparatus 2A.

The first information processing apparatus 2A includes a control unit 20, a storage unit 21, a communication unit 22, an input unit 23 and a display 24. The control unit 20 controls respective units of the first information processing apparatus 2A and is implemented by, e.g., a CPU. The storage unit 21 stores various data, a program or the like and is implemented by, e.g., a ROM, a RAM or a hard disk. The communication unit 22 is connected to a network 4 and is implemented by, e.g., a network interface card. The input unit 23 accepts a data input operation and is implemented by, e.g., a keyboard, a mouse or the like. The display 24 displays various screens and the like and is implemented by, e.g., a liquid crystal display or the like.

The first information processing apparatus 2A described above may be configured by, e.g., a computer, a personal digital assistant (PDA), a cellular phone or the like.

The storage unit 21 stores an information processing program 210 which executes respective steps in the flowchart shown in FIG. 4 to be described later.

The control unit 20 operates in accordance with the information processing program 210 so as to serve as an acceptance section 200, a conversion section 201, a storage location transmission section (transmission section) 202, a storage location reception section (reception section) 203, and a processing section 204. The processing section 204 included in the first information processing apparatus 2A configures a first processing section, while the processing section 204 included in the second information processing apparatus 2B configures a second processing section.

The acceptance section 200 accepts first storage location information that is indicative of where a file in the first file server 3A is stored. The first storage location information is represented by a path, for example, and the path may be an absolute path or a relative path.

The conversion section 201 converts the first storage location information accepted by the acceptance section 200 to second storage location information that is indicative of where a file in the second file server 3B is stored. This file has the same content as that of the file in the first file server 3A identified by the first storage location information.

The storage location transmission section 202 transmits the second storage location information converted by the conversion section 201 to the second information processing apparatus 2B.

The storage location reception section 203 receives the first storage location information from the second information processing apparatus 2B. The first storage location information which the storage location reception section 203 receives is converted by the conversion section 201 of the second information processing apparatus 2B so as to indicate where the file in the first file server 3A is stored.

When the acceptance section 200 accepts the first storage location information or when the storage location reception section 203 receives the first storage location information, the processing section 204 processes the file in the first file server 3A, which is identified by the first storage location information, in accordance with a specified processing content. In the exemplary embodiment, as the specified processing content, display processing for displaying the content of the file in the display 24 will be now described. However, the processing content is not limited to the display processing. For example, the processing content may be edit processing for editing the file or print processing for printing and outputting the file.

The processing section 204 applies annotation information (operation information) specified for the target file to be processed by one of the processing sections of the first and second information processing apparatus 2A and 2B to the target file to be processed by the other processing section.

"The annotation information" mentioned herein denotes annotation information such as a character string, a graphic, which is written in the file displayed on the display screen by the input unit 23. For example, the annotation information includes a position coordinate on the display screen, type information that is indicative of the type of the character string, the graphic or the like. When the type of the annotation information indicates the character string, the annotation information includes text information of the character string, font information of the character string, or the like. When the type of the annotation information indicates the graphic, the annotation information includes, e.g., graphic type information that is indicative of the types of the graphics such as a straight line, a free curve, a circle, a polygon or the like, and graphic characteristic information according to the types of the graphics such as, e.g., an arrangement of coordinates, a function indicative of a curve, or the like.

(Operation of First Exemplary Embodiment)

A description will be now given to the operation of the information processing system in the first exemplary embodiment.

(1) Synchronization Processing Between File Servers

At the synchronization time 301 specified by the synchronization setting information 30 shown in FIG. 2A, the first file server 3A transmits file list information that is indicative of the list of the files stored in the first synchronization target folder 300A to the second file server 3B via the WAN 10.

Next, upon receiving the file list information, the second file server 3B extracts a request target file and a transmission target file by comparing the file list information with the files stored in the second synchronization target folder 300B. The request target file denotes, as the basis for the files stored in the first synchronization target folder, a new file which is not present in the second synchronization target folder, and an updated file which is also stored in the second synchronization target folder and has an update date and time older than that of the corresponding file in the first synchronization target folder. In contrast, the transmission target file denotes, as the basis for the files stored in the second synchronization target folder, a new file which is not present in the first synchronization target folder and an updated file which is also stored in the first synchronization target folder and has the update date and time older than that of the corresponding file in the second synchronization target folder.

Subsequently, the second file server 3B obtains the transmission target file from the second synchronization target folder and then transmits the file and file request information that is indicative of the request target file to the first file server 3A.

Next, the first file server 3A stores the file received from the second file server 3B in the first synchronization target folder. In addition, the first file server 3A obtains the file requested by the file request information from the first synchronization target folder and then transmits the file to the second file server 3B.

Then, the second file server 3B stores the file received from the first file server 3A in the second synchronization target folder.

Thus, by performing the synchronization processing of the files using the first and second file servers 3A and 3B, the files having the same content are stored in the first synchronization target folder and in the second synchronization target folder, respectively.

(2) Display Processing of Designated File

Next, a description will be given to the case where a user A in the first business establishment 100A and a user B in the second business establishment 100B hold, e.g., a remote meeting. It is assumed that the user A operates the first information processing apparatus 2A and the user B operates the second information processing apparatus 2B.

Figure 4:
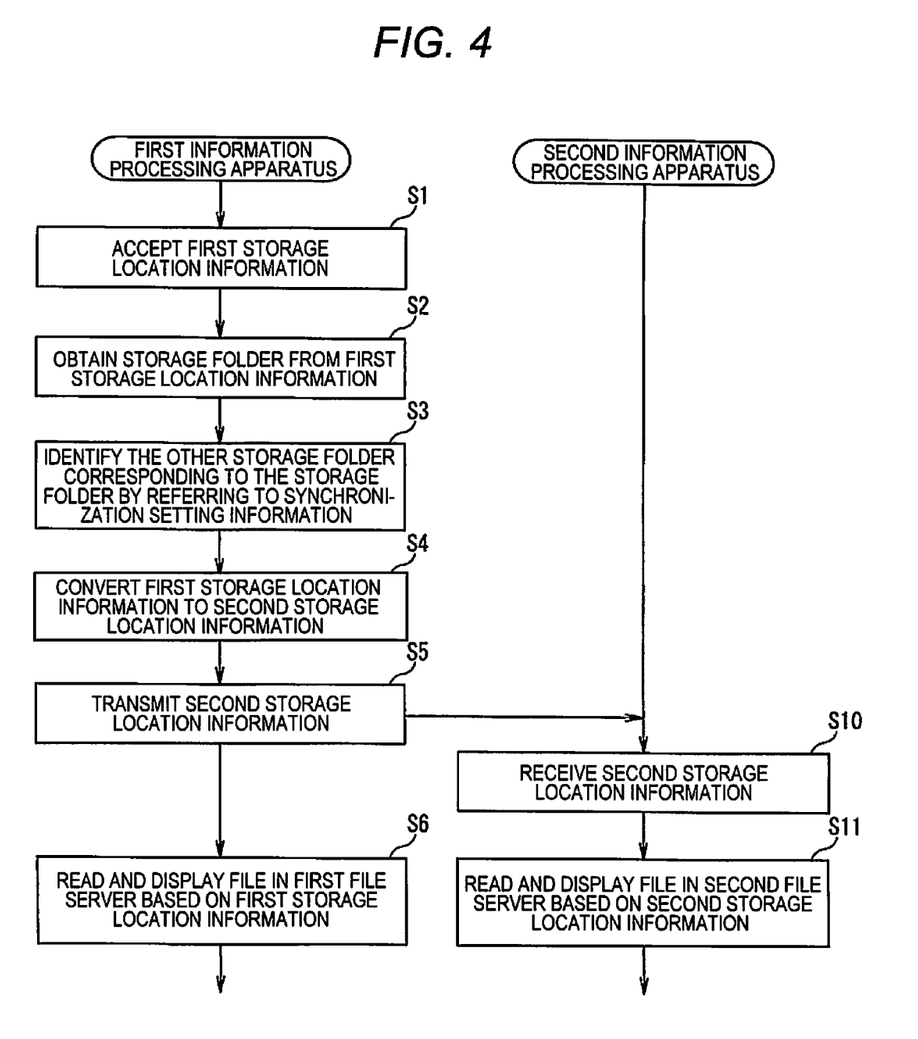
FIG. 4 is a flowchart showing an example of operations of first and second information processing apparatus according to the first exemplary embodiment of the present invention.

FIG. 4 is a flowchart showing an example of the operations of the first and second information processing apparatus. When the user A firstly designates a certain file among the files stored in the first synchronization target folder in the first file server 3A by using the input unit 23, the acceptance section 200 of the first information processing apparatus 2A accepts the designated file, i.e., the first storage location information that is indicative of the location where the designated file is stored (Operation S1).

Next, the conversion section 201 analyzes the first storage location information and obtains one storage folder where the designated file is stored (Operation S2). Subsequently, the conversion section 201 refers to the synchronization setting information 30 and identifies the other storage folder which corresponds to the one storage folder (Operation S3). For example, when the first storage location information indicates "Host A://Folder A/File A", the conversion section 201 obtains "Folder A" as one storage folder and identifies "Folder B" as the other storage folder.

Next, the conversion section 201 converts the first storage location information to the second storage location information using the other storage folder (Operation S4). In the example described above, the conversion section 201 converts the first storage location information to "Host B://Folder B/File A" as the second storage location information.

Subsequently, the storage location transmission section 202 transmits the converted second storage location information to the second information processing apparatus 2B via the WAN 10 (Operation S5).

Then, the processing section 204 reads the designated file from the first file server 3A based on the first storage location information and then displays the content of the file on the display screen of the display 24 (Operation S6).

On the other hand, the storage location reception section 203 of the second information processing apparatus 2B receives the second storage location information transmitted from the first information processing apparatus 2A (Operation S10). Then, the processing section 204 reads the designated file from the second file server 3B based on the second storage location information and then displays the content of the file in the display 24 (Operation S11).

Thus, the respective first and second information processing apparatus 2A and 2B display the files having the same content which are read from the first and second file servers 3A and 3B and are synchronized with each other by the synchronization processing. Accordingly, for example, even when it takes long time to transmit the file due to the slow communication speed of the WAN 10 or the large data amount of the file, because the data amount of the storage location information is relatively smaller than the data amount of the file, the file having the same content is displayed by each of the information processing apparatus 2A and 2B in a short period of time as compared with the transmission of the file.

Additionally, the description has been given to the operation when the first information processing apparatus 2A accepts the first storage location information based on the operation by the user A. In contrast, when the second information processing apparatus 2B accepts the second storage location information based on the operation by the user B, the second storage location information is converted to the first storage location information by the conversion section 201 of the second information processing apparatus 2B and then is transmitted to the first information processing apparatus 2A. Thereafter, the operations similar to the above-described operations are performed, whereby the files having the same content are displayed by the first and second information processing apparatus 2A and 2B.

(3) Response Processing of Operation to Designated File

When the user A performs a write operation of the annotation on the display screen on which the designated file is displayed through the input unit 23, the processing section 204 of the first information processing apparatus 2A generates the annotation information according to the write operation, updates the display screen based on the annotation information, and then transmits the annotation information to the second information processing apparatus 2B.

Then, upon receiving the annotation information from the first information processing apparatus 2A, the storage location reception section 203 of the second information processing apparatus 2B updates the display screen based on the annotation information.

Accordingly, the write operation of the annotation which the first information processing apparatus 2A performs is applied to the respective target files to be processed by the first and second information processing apparatus 2A and 2B.

Second Exemplary Embodiment

In the information processing system 1 according to the first exemplary embodiment, the first storage location information accepted by the acceptance section 200 of the first information processing apparatus 2A is converted to the second storage location information by the conversion section 201. Then, the second storage location information is transmitted to the second information processing apparatus 2B by the storage location transmission section 202, and the storage location reception section 203 of the second information processing apparatus 2B receives the second storage location information. Meanwhile, in the information processing system 1 according to the second exemplary embodiment, the first storage location information accepted by the first information processing apparatus 2A is transmitted to the second information processing apparatus 2B by the storage location transmission section 202 without conversion, the storage location reception section 203 of the second information processing apparatus 2B receives the first storage location information, and then the received first storage location information is converted to the second storage location information by the conversion section 201.

(Operation of Second Exemplary Embodiment)

A description will be now given to an example of the operation of the information processing system according to the second exemplary embodiment. Also, the synchronization processing between the file servers and the response processing of the operation to the designated file are the same as those in the first exemplary embodiment, and thus the display processing of the designated file will be described.

Figure 5:
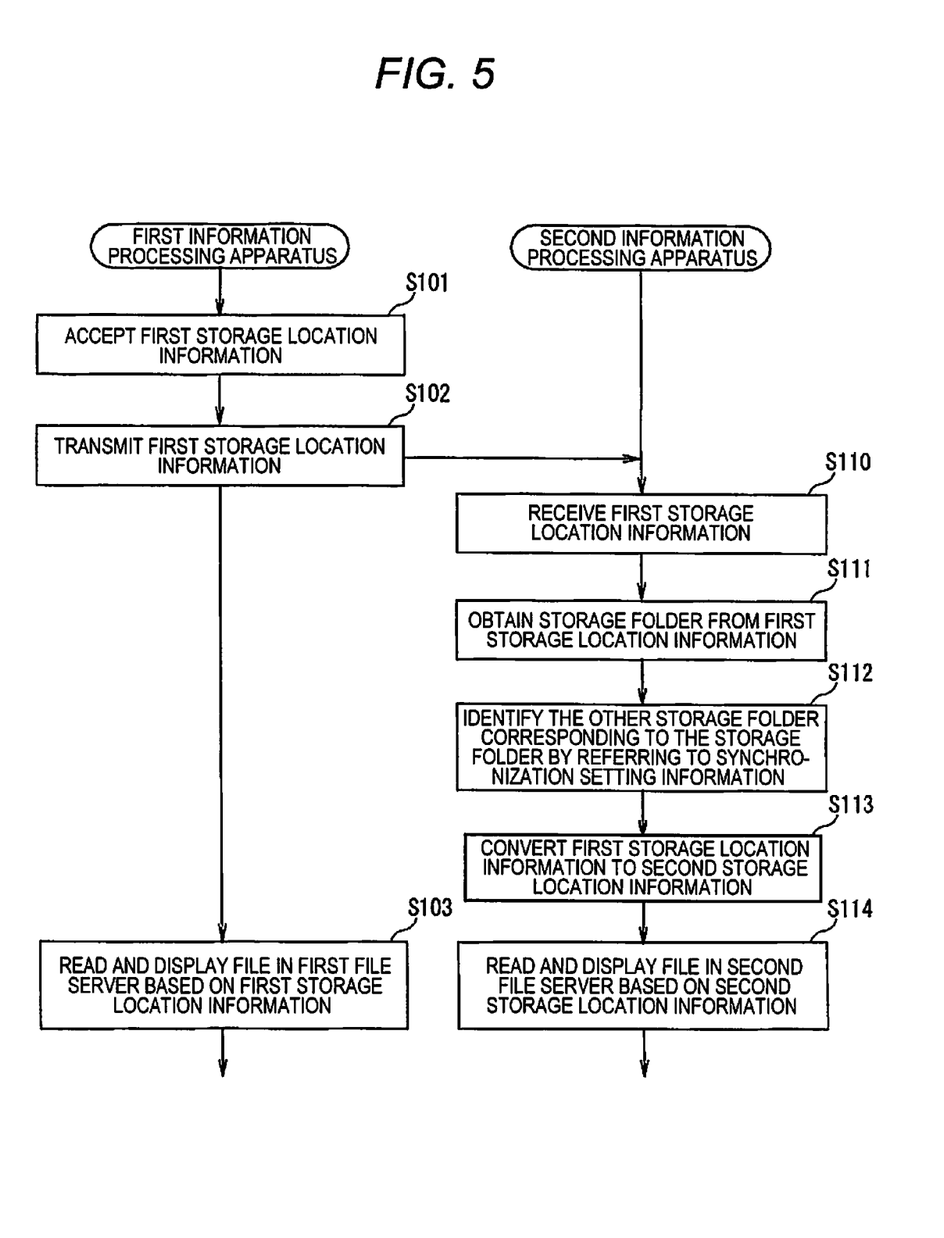
FIG. 5 is a flowchart showing an example of operations of first and second information processing apparatus according to a second exemplary embodiment of the present invention.

FIG. 5 is a flowchart showing an example of the operations of the first and second information processing apparatus. Similarly to the first exemplary embodiment, when the user A firstly designates a certain file, the acceptance section 200 of the first information processing apparatus 2A accepts the first storage location information that is indicative of the location where the designated file is stored (Operation S101).

Next, the storage location transmission section 202 transmits the first storage location information accepted by the acceptance section 200 to the second information processing apparatus 2B (Operation S102).

Subsequently, the processing section 204 reads the designated file from the first file server 3A based on the first storage location information and then displays the content of the file on the display screen of the display 24 (Operation S103).

On the other hand, the storage location reception section 203 of the second information processing apparatus 2B receives the first storage location information transmitted from the first information processing apparatus 2A (Operation S110).

Next, the conversion section 201 analyzes the first storage location information, obtains a storage folder where the designated file is stored (Operation S111), and then identifies the other storage folder which corresponds to the storage folder by referring to the synchronization setting information 30 (Operation S112).

Subsequently, the conversion section 201 converts the first storage location information to the second storage location information by using the other storage folder (Operation S113).

Then, the processing section 204 reads the designated file from the second file server 3B based on the second storage location information and displays the content of the file in the display 24 (Operation S114).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, in each of the exemplary embodiments described above, the respective sections in the information processing apparatus are implemented by using the control unit and the program. However, all or part of the sections may be implemented by hardware.

In addition, the program used in each of the above-described exemplary embodiments may be read into the storage unit in the apparatus from a storage medium such as a CD-ROM or the like, and the program may also be downloaded into the storage unit in the apparatus from a server or the like connected to the WAN.

What is claimed is:

1. An information processing system, comprising:
a first information processing apparatus on a first local area network (LAN); and
a second information processing apparatus on a second LAN connected to the first LAN over a network connection,
wherein the first information processing apparatus comprises:
an acceptance section that accepts first storage location information that indicates a first location on the first LAN at which a first electronic file is stored in a first storage unit;
a conversion section that (i) converts the first storage location information to second storage location information that indicates a second location on the second LAN at which a second electronic file is stored in a second storage unit on the second LAN, the second electronic file having an identical content as that of the first electronic file and (ii) transmits the second storage location information from the first processing section to the second information processing over the network connection; and
a first processing section that (i) modifies contents of the first electronic file in accordance with a processing instruction input by a user of the first information processing apparatus and displays the modified contents of the first electronic file on a first display of the first information processing apparatus, and (ii) transmits to the second processing apparatus information that indicates the processing instruction, and
wherein the second information processing comprises:
a second processing section that (i) receives the second storage location information over the network connection, accesses the second electronic file from the second location using the second storage location information, and displays the second electronic file on a second display of the second information processing apparatus, and (ii) receives the information that indicates the processing instruction over the network connection, modifies contents of the second electronic file in accordance with the processing instruction indicated by the information, and displays the modified contents of the second electronic file on the second display.

2. The system according to claim 1, wherein the processing instruction comprises a write operation to annotate the first electronic file with annotation information, and
wherein the information that indicates the processing instruction comprises the annotation information to be applied to the second electronic file.

3. An information processing apparatus, comprising:
an acceptance section that accepts first storage location information that indicates a first location on a first local area network (LAN) of the information processing apparatus at which a first electronic file is stored in a first storage unit;
a conversion section that converts the first storage location information to second storage location information that indicates a second location on a second LAN connected to the first LAN over a network connection at which a second electronic file is stored in a second storage unit, the second electronic file having an identical content as that of the first electronic file;
a transmission section that transmits over the network connection the second storage location information from the information processing apparatus to another information processing apparatus for processing the second electronic file; and
a processing section that modifies contents of the first electronic file in accordance with a processing instruction input by a user of the first information processing apparatus and displays the modified contents of the first electronic file on a first display of the first information processing apparatus, and transmits to the second processing apparatus information that indicates the processing instruction for modifying the second electronic file in accordance with the processing instruction.

4. The information processing apparatus according to claim 3, wherein the processing instruction comprises a write operation to annotate the first electronic file with annotation information, and
wherein the information that indicates the processing instruction comprises the annotation information to be applied to the second electronic file.

5. An information processing apparatus, comprising:
a reception section that receives from another information processing apparatus over a network connection first storage location information that indicates a first location, on a first local area network (LAN) connected over the network connection to a second LAN of the information processing apparatus, at which a first electronic file is stored in a first storage unit;
converts the first storage location information to second storage location information that indicates a second storage location on the second LAN at which a second electronic file is stored in a second storage unit, the second electronic file having an identical content as that of the first electronic file; and
a processing section that accesses the second electronic file from the second location based on the converted second storage location information, displays the second electronic file on a display of the information processing apparatus, receives from the another information processing apparatus over the network connection information that indicates a modification of the first electronic file to be applied to the second electronic file, applies the modification to contents of the second electronic file in accordance with the received information, and displays the modified contents of the second electronic file on the display.

6. The information processing apparatus according to claim 5, wherein the processing instruction comprises a write operation to annotate the first electronic file with annotation information, and
wherein the information that indicates the processing instruction comprises the annotation information to be applied to the second electronic file.

7. A non-transitory computer readable medium storing a program causing a computer to execute an information process, the information process comprising:
indicates a first location, on a first local area network (LAN) of a first information processing apparatus, at which a first electronic file is stored in a first storage unit;
converting the first storage location information to second storage location information that indicates a second location on a second LAN connected to the first LAN over a network connection at which a second electronic file is stored in a second storage unit, the second electronic file having an identical content as that of the first electronic file;
over the network connection the second storage location information from the first information processing apparatus to a second information processing apparatus on the second LAN;
receiving a processing instruction to modify contents of the first electronic file;
modifying the contents of the second electronic file in accordance with the received processing instruction and displaying the modified contents of the first electronic file on a display of the first information processing apparatus; and
transmitting to the second processing apparatus information that indicates the processing instruction to be applied to the second electronic file.

8. The non-transitory computer readable medium according to claim 7, wherein the processing instruction comprises a write operation to annotate the first electronic file with annotation information, and
wherein the information that indicates the processing instruction comprises the annotation information to be applied to the second electronic file.

9. An information processing method, the method comprising:
indicates a first location, on a first local area network (LAN) of a first information processing apparatus, at which a first electronic file is stored in a first storage unit;
converting the first storage location information to second storage location information that indicates a second location on a second LAN connected to the first LAN over a network connection at which a second electronic file is stored in a second storage unit, the second electronic file having an identical content as that of the first electronic file;
over the network connection the second storage location information from the first information processing apparatus to a second information processing apparatus on the second LAN;
receiving a processing instruction to modify contents of the first electronic file;
modifying the contents of the second electronic file in accordance with the received processing instruction and displaying the modified contents of the first electronic file on a display of the first information processing apparatus; and
transmitting to the second processing apparatus information that indicates the processing instruction to be applied to the second electronic file.

10. An information processing system, comprising:
a first information processing apparatus on a first local area network (LAN); and
a second information processing apparatus on a second LAN connected to the first LAN over a network connection,
wherein the first information processing apparatus comprises:

an acceptance section that receives from a first user of the first information processing apparatus a first input of a first location on the first LAN at which a first electronic file is stored;

a first processing section that accesses the first electronic file from the first location and controls a first display of the first information processing apparatus to display the first electronic file;

a conversion section that converts the first location to a second location on the second LAN at which a second electronic file is stored, the second electronic file being identical to the first electronic file, and transmits the second location to the second information processing apparatus over the network connection, and wherein the second information processing apparatus comprises:

a second processing section that receives the second location over the network connection from the first information processing apparatus, accesses the second electronic file from the second location, controls a second display of the second information processing apparatus to display the second electronic file.

* * * * *